US010586106B2

(12) United States Patent
Manohar et al.

(10) Patent No.: US 10,586,106 B2
(45) Date of Patent: Mar. 10, 2020

(54) RESPONSIVE SPATIAL AUDIO CLOUD

(71) Applicant: Microsoft Technology Licensing, LLC, Redmond, WA (US)

(72) Inventors: Swaminathan Manohar, Bangalore (IN); Swapna C. Joshi, Bloomington, IN (US); Sujeath Pareddy, Hyderabad (IN); Abhay Kumar Agarwal, Bangalore (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 142 days.

(21) Appl. No.: 15/423,281

(22) Filed: Feb. 2, 2017

(65) Prior Publication Data
US 2018/0217804 A1 Aug. 2, 2018

(51) Int. Cl.
*G06K 9/00* (2006.01)
*G10L 13/00* (2006.01)
*H04W 4/80* (2018.01)

(52) U.S. Cl.
CPC .......... *G06K 9/00671* (2013.01); *G10L 13/00* (2013.01); *H04W 4/80* (2018.02)

(58) Field of Classification Search
CPC ... G06F 3/16; G06F 3/04842; G06K 9/00671; G10L 13/00; H04W 4/008; H04W 4/80
USPC ........... 348/14.01–14.16; 381/1, 23.01, 312, 381/313, 320; 700/94
See application file for complete search history.

(56) References Cited

U.S. PATENT DOCUMENTS

| 8,660,581 | B2 * | 2/2014 | Davis | H04W 4/023 455/456.3 |
| 9,037,400 | B2 | 5/2015 | Tolstedt et al. | |
| 9,140,554 | B2 * | 9/2015 | Jerauld | G02B 27/017 |
| 9,727,129 | B2 * | 8/2017 | Di Censo | G06F 3/011 |
| 2005/0108646 | A1 * | 5/2005 | Willins | G01C 21/20 715/723 |

(Continued)

OTHER PUBLICATIONS

Xiao, et al., "An Assistive Navigation Framework for the Visually Impaired", In Journal of IEEE Transactions on Human-Machine Systems, vol. 45 Issue 5, Oct. 2015, pp. 635-640.

(Continued)

*Primary Examiner* — Hemant S Patel
(74) *Attorney, Agent, or Firm* — Merchant & Gould (57) ABSTRACT

An interactive and responsive presentation of spatially-associated information related to a user's environment based on the user's context is provided. Aspects of a 3D audio cloud system extract information about entities in the user's environment, and generate and provide the user with a 3D audio cloud that presents a spatial audio representation of entities in the user's environment that gives the user cues as to where the entities are located with respect to the user. An entity can be represented in a descriptive manner that provides the user with various types of information about the entity (e.g., shape, size, color, others' opinions, actions, emotions). Further, aspects of the 3D audio cloud system dynamically update the 3D audio cloud based on the user's location, position, or orientation, receive selection input from the user associated with the 3D audio cloud, and retrieve and present additional information as requested by the user.

20 Claims, 9 Drawing Sheets

(56) References Cited

U.S. PATENT DOCUMENTS

| | | | | |
|---|---|---|---|---|
| 2009/0122161 | A1* | 5/2009 | Bolkhovitinov | A61H 3/061 348/234 |
| 2013/0263016 | A1* | 10/2013 | Lehtiniemi | G06T 19/006 715/753 |
| 2016/0142830 | A1* | 5/2016 | Hu | G02C 11/06 434/185 |
| 2016/0150340 | A1* | 5/2016 | Seligmann | H04R 27/00 381/1 |
| 2017/0045941 | A1* | 2/2017 | Tokubo | G06F 3/167 |
| 2017/0109916 | A1* | 4/2017 | Kurz | G06T 11/00 |
| 2017/0278507 | A1* | 9/2017 | Blyumen | G10L 13/10 |

OTHER PUBLICATIONS

D'Auria, et al., "Interactive Headphones for a Cloud 3D Audio Application", In Proceedings of Ninth International Conference on P2P, Parallel, Grid, Cloud and Internet Computing, Nov. 8, 2014, pp. 437-442.

Sanchez, et al., "Virtual Environment Interaction through 3D Audio by Blind Children", In Proceedings of Cyberpsychology and Behavior, vol. 2, Issue 2, 1999, 12 pages.

Marentakis, et al., "Gesture Interaction with Spatial Audio Displays: Effects of Target Size and Inter-Target Separation", In Proceedings of ICAD 05-Eleventh Meeting of the International Conference on Auditory Display, Jul. 6, 2005, 8 pages.

Jiang, et al., "Let Blind People See: Real-Time Visual Recognition with Results Converted to 3D Audio", In Publication of Stanford University, Sep. 26, 2016, pp. 1-7.

Mhaish, et al., "Assessment of a visual to spatial-audio sensory substitution system", In 24th IEEE Signal Processing and Communication Application Conference, May 24, 2016, 4 pages.

Holland, et al., "AudioGPS: Spatial Audio Navigation with a Minimal Attention Interface", In Journal of Personal and Ubiquitous Computing archive vol. 6, Issue 4, Sep. 2002, 4 pages.

Wilson, et al., "SWAN: System for Wearable Audio Navigation", In 11th IEEE international symposium on wearable computers, Oct. 11, 2007, 8 pages.

Zeng, et al., "Exploration and avoidance of surrounding obstacles for the visually impaired", In Proceedings of the 14th international ACM SIGACCESS conference on Computers and accessibility, Oct. 22, 2012, pp. 111-118.

Aladren, et al., "Navigation Assistance for the Visually Impaired Using RGB-D Sensor With Range Expansion", In IEEE Systems Journal, vol. 10, Issue 3, Sep. 2016, pp. 922-932.

* cited by examiner

MOBILE COMPUTING DEVICE

RESPONSIVE SPATIAL AUDIO CLOUD

BACKGROUND

There are various scenarios in which an individual may need or wish to use assistive technology for receiving information about the space around him/her. For example, visually impaired persons (VIPs) today cannot autonomously engage with and experience the environment around them. Many VIPs may be dependent on sighted persons to help them interpret what is around them. VIPs may also rely on technologies or tools that possibly help the VIP with discrete functional aspects, such as avoiding obstacles or navigating from one point to another.

Previous solutions for VIPs fall under the category of specific task-based assistance. Some examples include: augmented white cane with ultrasound sensors and vibrators to indicate position of obstacles beyond the range of the cane; computer vision based approaches to detect obstacles and entities and to provide an obstacle free path to reach a desired destination without bumping into any entities along the way; laser based entity detection and ranging for conveying the information about entities and obstacles to the blind; face recognition technologies to convey the identity of the persons in front using image capture and deep learning; emotion and age recognition of people around using similar deep learning approaches; scene description from images using deep learning; computer vision and machine learning approaches to identify and describe entities and textual information on entities and displays; earcons and audiocons to convey visual information using sound; spatial sound to indicate position of entities; and sensory substitution approaches: visual to haptics and visual to audio.

The above examples provide specific task-based assistance, but do not provide an interactive and responsive presentation of data to the user based on the need and context of the user.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and device for providing an interactive and responsive presentation of spatially-associated information related to a user's environment based on the user's context. Aspects of a 3D audio cloud system extract information about entities, including people and other living entities, in the user's environment, and generate and provide the user with a 3D audio cloud that presents a spatial audio representation of entities in the user's environment. For example, the audio cloud is embodied as audible cues that are spatialized to sound as if emanating from a physical location. The audible cues can include one or a combination of spoken words, synthetic sounds, played back natural sounds, music, etc. According to an aspect, the 3D audio cloud presents abstract information about entities based on the user's context and needs at the time. For example, aspects of the 3D audio cloud system can present the user with functional information, social information, or aesthetic information that are spatialized as appropriate. Further, aspects of the 3D audio cloud system dynamically update the 3D audio cloud based on the user's location, position, or orientation, receive selection input from the user associated with the 3D audio cloud, and retrieve and present the user with additional information as requested by the user.

Examples are implemented as a computer process, a computing system, or as an article of manufacture such as a device, computer program product, or computer readable medium. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage medium for providing an interactive and responsive presentation of spatially-associated information related to a user's environment based on the user's context. According to examples, when a user enters a space or environment, the user may wish to learn about the environment, particularly in cases where the user may be visually impaired. Accordingly, a 3D Audio Cloud System is provided for enabling the user to explore the environment by capturing information about the environment and generating a presentation of the information in a way that the user is able to receive and perceive.

Figure 1A:
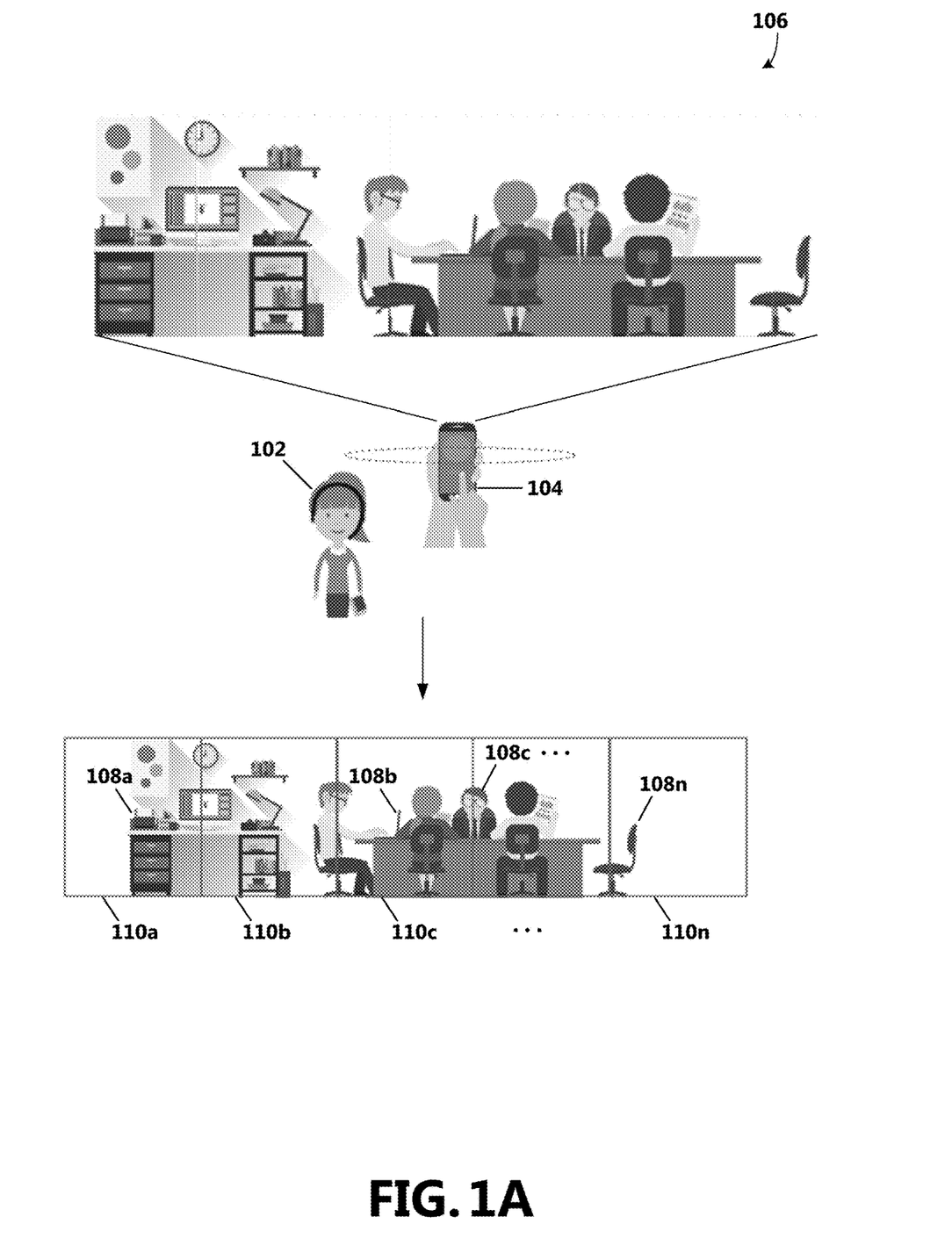
FIG. 1A-1C show an example use case of aspects of a system for providing an interactive and responsive presentation of spatially-associated information related to a user's environment based on the user's context.
Figure 1B:
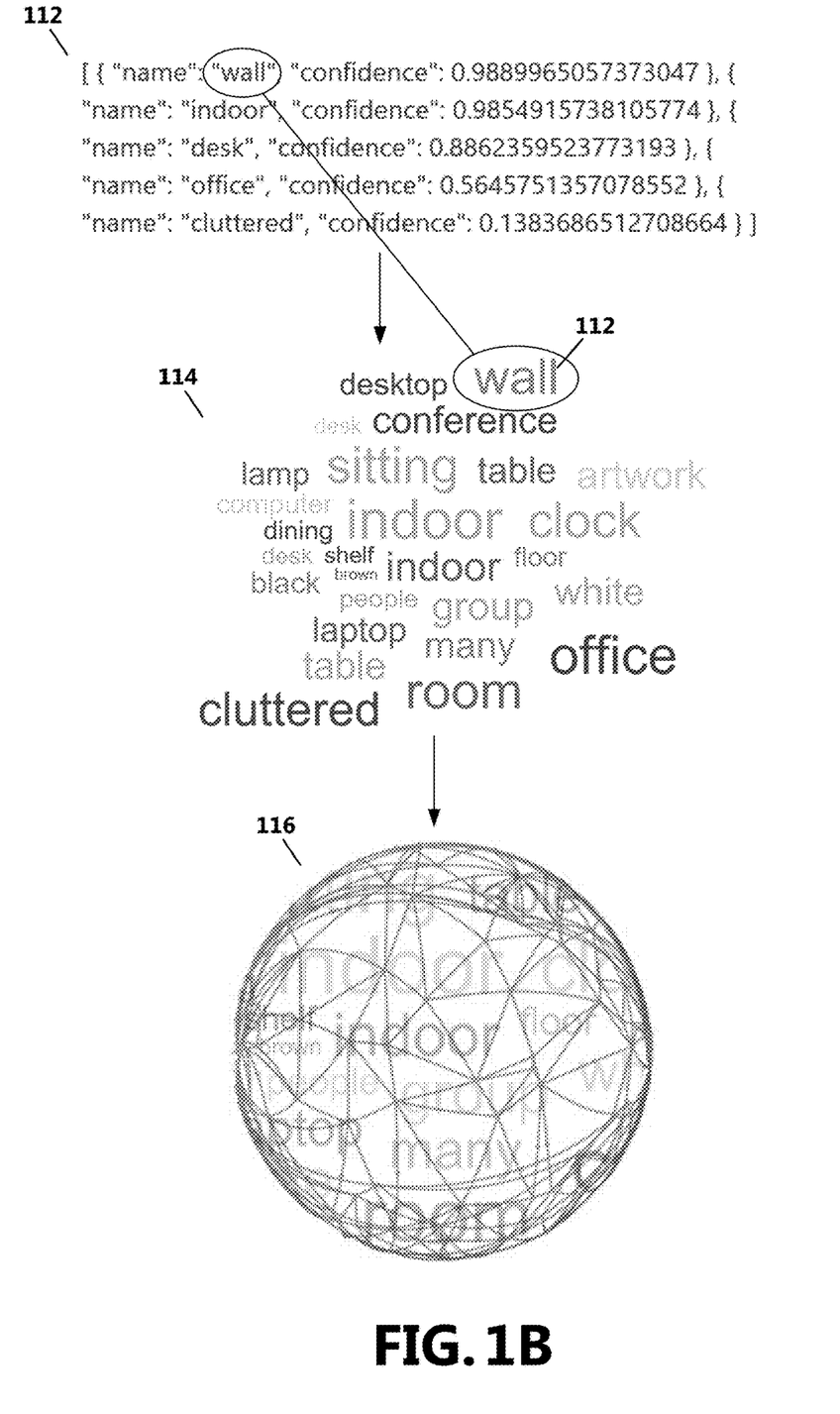
Figure 1C:
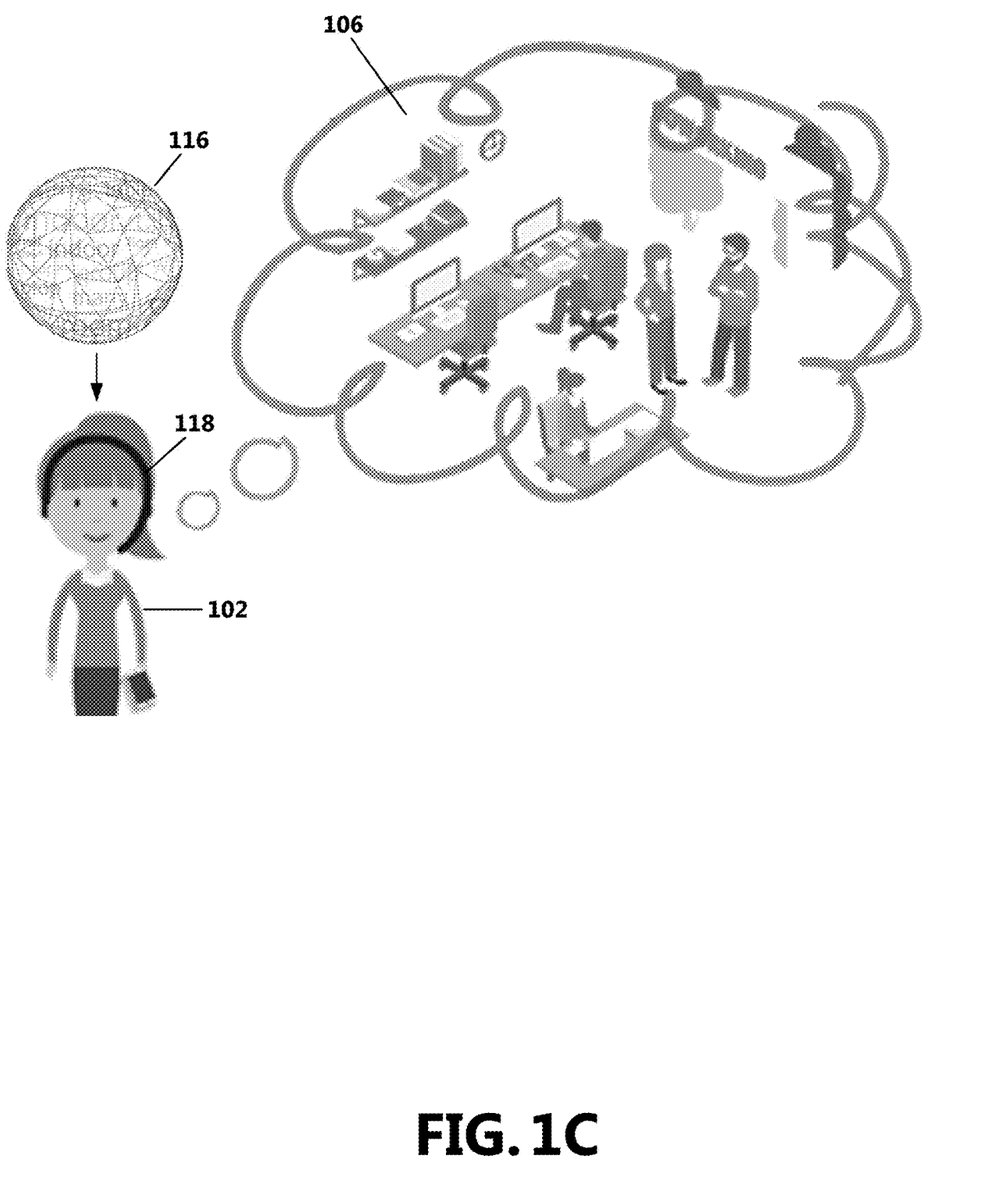

With reference to FIGS. 1A-1C, various environmental capture devices 104 may be used for acquiring information about the user's position, orientation, and environment 106, such as one or more cameras, depth-sensing cameras, radio frequency identification (RFID) readers, short-range wireless (e.g., complying to the BLUETOOTH® standard) low energy readers, Global Positioning System (GPS) receivers, gesture control devices, accelerometers, etc. An environmental capture device 104 may be worn by the user 102 (e.g., attached to headphone, spectacles, a belt, jewelry), carried by the user, integrated with a device (e.g., phone, watch) used by the user, attached to an instrument used by the user (e.g., cane, guide dog), etc. In one example, one or more environmental capture devices 104 capture one or more images (e.g., raster images, depth images) of the environment 106. In another example, one or more environmental capture devices 104 record a panoramic video of the environment 106 from a point, which is converted into a plurality of frames 110a-n (collectively 110) or images. In another example, the one or more environmental capture devices 104 read fiducial tags in the environment, for example, via optical or RF means to acquire data related to the fiducial tags from a network database.

Entities 108a-n (collectively 108) (including persons or other living entities) and attributes in the user's environment 106 are identified and are converted to text 112, from which a word cloud 114 is generated. Coordinates of the entities 108 are determined and applied to the text 112, and in some examples, sound properties are applied to the text 112. For example, attributes of an entity 108 (e.g., a bell) can be converted to a textual description of the entity 108 that is converted to speech, to a synthesized audible cue representative of the entity (e.g., a sound of the bell), or to a synthesized audible cue representative of the context of the entity (e.g., a dangerous edge can be represented as speech, such as "danger; fall," or a warning beep).

A three-dimensional (3D) audio cloud 116 is generated for presentation to the user 102 via a spatial audio-enabled device 118 (e.g., spatial audio-enabled headset, earbuds, speaker). For example, sound waves are produced to announce entities 108 (e.g., entity names, entity attributes, audible cues representative of entities 108 or of context of entities 108) in the user's environment 106 simulated to originate from each entity's position, thus providing a virtual 3D audio cloud that exposes the location and distance of entities 108 in the environment 106 respective to the user 102. Various attributes associated with an entity 108 can be provided to the user 102. For example, an entity's location, shape, size, color, or other physical attributes can be identified and presented. Additionally, attributes associated with a person can be provided to the user 102, such as the person's identity, the person's physical appearance, the person's clothing, the person's activities, the person's emotions, etc.

According to an aspect, an announcement of an entity 108 via the 3D audio cloud 116 can be functionally-related, socially-related, or aesthetically-related based on context or needs of the user 102. For example, a painting on a wall may or may not be announced to a user 102. In a functionally or navigationally-oriented scenario, the wall may be announced to the user 102 as an obstacle to be avoided. When the user 102 selects to receive aesthetic aspects of an environment 106, the painting may be audibly-represented by a description of the painting (e.g., a floral acrylic painting) spatialized at the location of the wall. When the user 102 selects to receive social-related information, descriptions, comments, etc., about the painting provided by other individuals or by an information provider can be collected and spatially presented to the user 102.

In some examples, the spatial audio-enabled device 118 is integrated with one or more of the environmental capture devices 104 (e.g., intelligent headset). As the user 102 moves through the environment 106 or moves the user's head position, the 3D audio cloud 116 is adjusted accordingly, helping the user 102 to accurately localize entities 108. Audible output provided via the spatial audio-enabled device 118 may include spoken words, music, tones, natural sounds, synthesized sounds, etc.

The user 102 is enabled to interact with announced entities 108, for example, to receive additional information about a specific entity 108. Accordingly, the user 102 is enabled to receive information about entities 108 in the user's environment 106 based on the intent or needs of the user 102. As can be appreciated, aspects of the present disclosure can be used by a visually-impaired user 102 or by a non-visually-impaired user 102 to explore an environment 106 with confidence and independence. Information is presented to the user 102 based on the user's needs, which can advantageously reduce retrieval and presentation of information that is not useful to the user 102.

Figure 2:
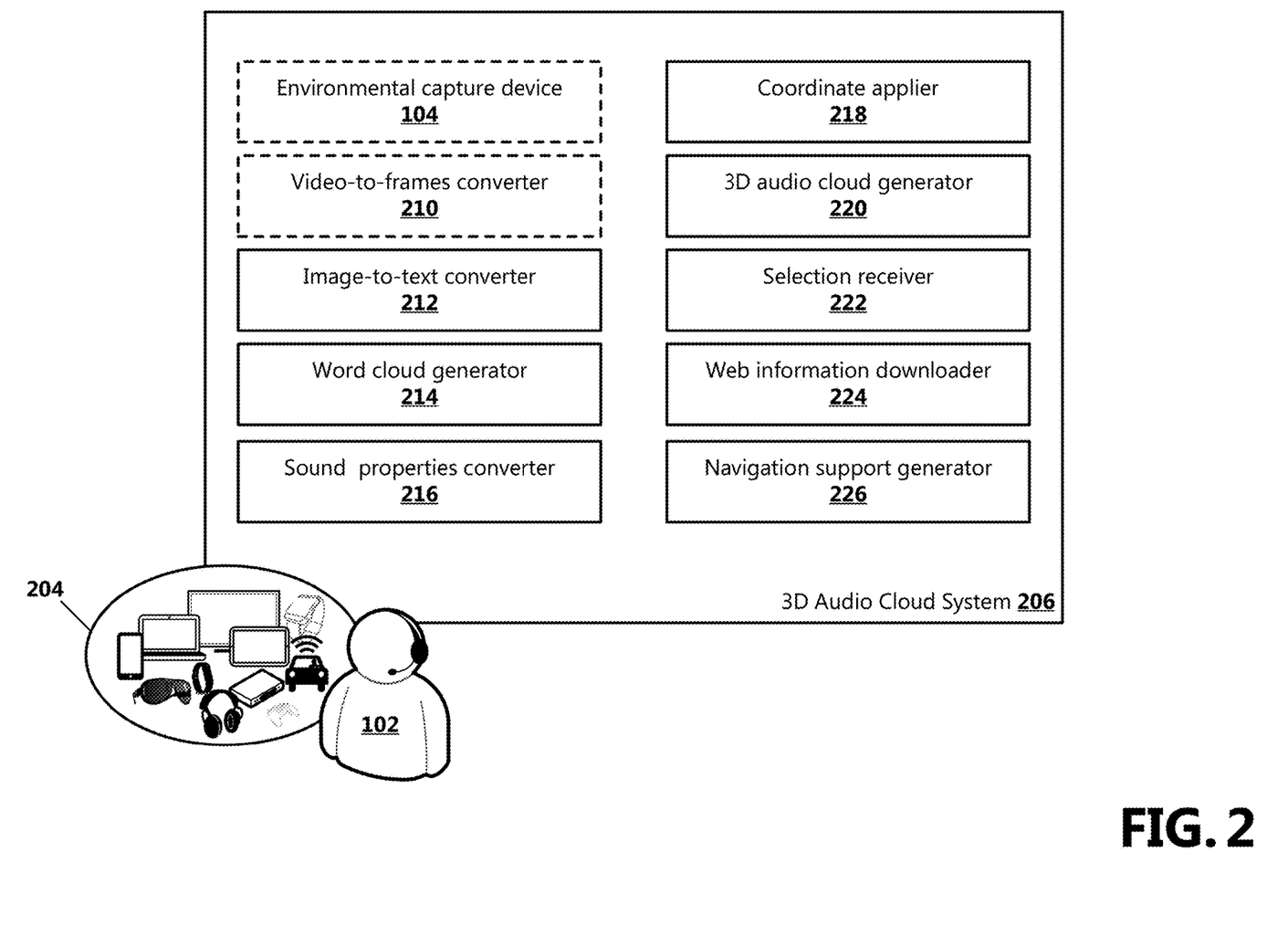
FIG. 2 is a block diagram showing components of a system for providing an interactive and responsive presentation of spatially-associated information related to a user's environment based on the user's context.

With reference now to FIG. 2, a block diagram showing components of the 3D Audio Cloud System 206 that are used for providing an interactive and responsive presentation of spatially-associated information related to a user's environment 106 is shown. One or more components of the 3D Audio Cloud System 206 execute on at least one electronic computing device 204, which may be one or more of various types of computing devices (e.g., a tablet computing device, a desktop computer, a mobile communication device, a laptop computer, a laptop/tablet hybrid computing device, a large screen multi-touch display, a gaming device, a smart television, a wearable device, or other type of computing device). The hardware of these computing devices is discussed in greater detail in regard to FIGS. 4, 5A, 5B, and 6. One or more components of the 3D Audio Cloud System 206 may be stored locally on the at least one computing device 204, or may reside on a remote server and be accessed over a network. In some examples, the computing device 204 includes one or more application programming interfaces (APIs), operative to enable the 3D Audio Cloud System 206 to employ one or more 3D audio cloud generation services via stored instructions. As should be understood, although components of the 3D Audio Cloud System 206 are illustrated singularly, the components may be combined in one or a combination of components, and each component may include a plurality of components.

Aspects of the 3D Audio Cloud System 206 are operative to extract information about entities 108 in the user's environment 106, and generate and provide the user 102 with a 3D audio cloud 116 that presents a spatial audio representation of entities in the user's environment 106 that gives the user 102 cues as to where the entities 108 are located with respect to the user 102. Further, aspects of the 3D Audio Cloud System 206 are operative to dynamically update the 3D audio cloud 116 based on the user's location, position, or orientation, receive selection input from the user 102 associated with the 3D audio cloud 116, and retrieve and present the user 102 with additional information as requested by the user 102.

According to an aspect, the 3D Audio Cloud System 206 optionally includes or is operatively connected to one or more environmental capture devices 104. An environmental capture device 104 is illustrative of a software module, system, or device operative to record one or more images of the user's environment 106. For example, the one or more environmental capture devices 104 may include a camera, a depth-sensing camera, a radio frequency identification (RFID) reader, a short-range wireless (e.g., BLUETOOTH®) low energy reader, or the like. According to one example, the one or more environmental capture devices 104 include a video recorder operative to record a video file of the user's environment 106. According to another example, the video file is a 3D video file. According to another example, the one or more environmental capture devices 104 are operative to capture a panoramic (e.g., 360-degree) video or image of the user's environment 106 from a pivot point. The one or more environmental capture devices 104 may be integrated with the computing device 204, may be a separate device, or may be integrated with a separate device that is communicatively attached to the computing device 204. For example, one or more environmental capture devices 104 may be integrated with the user's mobile phone, a wearable device, a headset or other device. The images recorded by the one or more environmental capture devices 104 may include known entities 108, as well as unidentifiable or unknown entities 108. The entities 108 may be organic entities (e.g., persons, animals, plants), non-organic entities, RFID tags, short-range wireless low energy beacons, etc. In some examples, the 3D Audio Cloud System 206 is operative to receive one or more (e.g., a plurality) prerecorded images. For example, the 3D Audio Cloud System 206 can receive frames of a 3D immersive movie comprising entities 108 that can be identified, audibly represented, and spatially presented to the user 102.

According to an aspect, the 3D Audio Cloud System 206 optionally includes or is operatively connected to a video-to-frames converter 210. The video-to-frames converter 210 is illustrative of a software module, system, or device operative to convert a video file into a plurality of static frames 110 or images. For example, the video-to-frames converter 210 is operative to receive a video file or 3D video file, which can be received by the 3D Audio Cloud System 206 or captured by the one or more environmental capture devices 104, and convert the video file or 3D video file to a plurality of frames 110 which can be analyzed for identifying one or more entities 108 in the user's environment 106.

According to an aspect, the 3D Audio Cloud System 206 includes or is operatively connected to an image-to-text converter 212. The image-to-text converter 212 is illustrative of a software module, system, or device operative to identify entities 108 in the plurality of frames 110, perform image recognition on the entities 108, and provide text 112 associated with the recognized entities 108. In some examples, identification of entities 108 includes identification of features or attributes associated with entities 108. The identified features or attributes can then be converted to text (e.g., "smiling person wearing a blue dress"). The image-to-text converter 212 is operative to recognize various types of entities 108, such as persons, animals, works of art, types of plants, buildings, rooms, pieces of furniture, food items, etc. When a specific entity 108 is known by the system, the image-to-text converter 212 is operative to provide text 112 associated with the specific entity 108 (e.g., a person's name, a specific work of art, a specific landmark). Further, various features associated with entities 108 are identified and converted to text 112 (e.g., size of the entity 108, shape of the entity 108, color of the entity 108). According to an aspect, the description of an entity 108 is based on one of a functional context, a social context, or an aesthetic context. The context may be preset, or may be selected by the user 102.

In some examples, a bounding box is applied to each entity 108 in a frame 110, and the size of the entity 108 is determined based on the bounding box dimensions. A confidence score may be provided for each recognized entity 108 or entity feature. In some examples, the image-to-text converter 212 is further operative to extract pieces of textual information from information gathered from captured RFID tags or from short-range wireless low energy beacons.

According to an aspect, the 3D Audio Cloud System 206 further includes or is operatively connected to a word cloud generator 214, illustrative of a software module, system, or device operative to generate a word cloud 114 from text 112 provided by the image-to-text converter 212. In examples, a size factor is applied to text 112 (e.g., each word) in the word cloud 114. In some examples, the size factor is based on the prominence of the entity 108 in the environment 106. In other examples, the size factor is based on the confidence score. In other examples, the size factor is based on the size of the associated entity 108. In other examples, the size factor is based on a determined importance or relevance of the associated entity 108 in the environment 106 or to the user 102. Relevance of an entity 108 to the user 102 may be determined based on factors such as the user's current activity (e.g., based on calendar items in the user's calendar, input by the user 102, or other contextual information).

The 3D Audio Cloud System 206 further includes or is operatively connected to a sound properties converter 216. According to an aspect, the sound properties converter 216 is illustrative of a software module, system, or device operative to convert an identified entity 108 to an audio cloud 116. According to one example, the sound properties converter 216 converts text 112 from the word cloud 114 to an audio cloud by assigning sound properties to the words. In some examples, the sound properties converter 216 additionally or alternatively assigns music, a tone, a natural sound, or a synthesized sound to text 112. For example, an entity 108 may be audibly represented by a textual description, music, a tone, a natural sound, or a synthesized sound. In other examples, a degree of volume may be applied to words based on the size factor applied to the text 112. Other sound properties may be applied.

According to an aspect, the 3D Audio Cloud System 206 further includes a coordinates applier 218. The coordinates applier 218 is illustrative of a software module, system, or device operative to apply coordinates data associated with entities 108 or attributes in the user's environment 106 to text 112 in the word cloud 114 such that the entities 108 can be spatially represented when the entities 108 or attributes are played back to the user 102, thus giving the user 102 cues as to where the entities 108 or attributes are located with respect to the user 102. For example, the coordinates data can include location data (e.g., elevation, distance from the user 102, angle) of each entity 108. Coordinates data may be determined based on information extracted from the recorded image(s), GPS data, or other captured data from the user's environment 106.

The 3D Audio Cloud System 206 further includes a 3D audio cloud generator 220, illustrative of a software module, system, or device operative to generate a spatialized 3D audio cloud 116 associated with the user's environment 106. For example, when the coordinate data are applied to the word cloud 114, each word becomes a sound source in the 3D audio cloud 116. The 3D audio cloud generator 220 presents the 3D audio cloud 116 to the user 102 via a spatial audio-enabled device 118, such as a spatial audio-enabled headset, earbuds, speaker, etc. According to an aspect, based on the coordinate data, a sound for each of the words (text 112) in the word cloud 114 is generated such that the sounds are presented as if coming from where the entities 108 the words represent are located (e.g., direction, distance) in the environment 106 relative to the user 102. Accordingly, the user 102 is enabled to perceive the space around the user 102 based on the spatialized 3D audio cloud 116.

According to an aspect, the 3D Audio Cloud System 206 further includes a selection receiver 222, illustrative of a software module, system, or device via which the user 102 is enabled to interact with the system. For example, the selection receiver 222 is operative to receive input from the user 102 via one or more various types of input methods, such as those relying on a keyboard or remote control, as well as Natural User Interface (NUI) methods, which enable a user to interact with the system in a "natural" manner, such as via speech recognition, touch and stylus recognition, gesture recognition both on screen and adjacent to the screen, air gestures, head and eye tracking, voice, speech, sound, touch, hover, and machine intelligence. The user input results in a selection of part of the 3D audio cloud 116, such as a specific word or an area of the 3$d$ audio cloud 116.

In one example, the user 102 is enabled to select an area of the 3D audio cloud 116, for example, by using head or hand gestures directed to a particular area of spatial sound that is of interest to the user 102. The selection receiver 222 is operative to receive the user's input, and determine the region in the user's environment 106 associated with the selected area of the 3D audio cloud 116. The selection receiver 222 is further operative to communicate with the environmental capture devices 104 for providing the environmental capture device 104 with an indication of the region in the user's environment 106 associated with the selected area of the 3D audio cloud 116. The environmental capture device 104 is further operative to receive the communication, zoom into the selected region, and capture additional video or images of the selected region such that a 3D audio cloud 116 of the selected region can be generated.

In another example, the user 102 is enabled to select a particular word in the 3D audio cloud 116, for example, by using a remote control-type device, head or hand gestures, speech command, etc. The selection receiver 222 is operative to receive the user's input, and determine the location information (e.g., coordinates data of the entity 108 associated with the selected word). The selection receiver 222 is further operative to provide the location information to a navigation support generator 226, illustrative of a software module, system, or device operative to generate audio/sonic guidance to the location of the selected entity 108. According to an aspect, the navigation support generator 226 is operative to determine a nearest route to the selected entity 108. According to another aspect, the navigation support generator 226 is operative to detect obstacles between the user 102 and the selected entity 108, and provide an alert to the user 102 to help the user 102 to navigate around detected obstacles. In some examples, the guidance is provided via sound cues (e.g., beeps). In other example, the guidance is provided via audio directions (e.g., "the desk is in the direction of 2 o'clock, 6 feet away") or 3D audio directions.

In another example, the user 102 is enabled to replay all or a portion of the 3D audio cloud 116, for example, by giving speech commands or gestures. For example, the user 102 may use a particular gesture to receive spatial data within a specific radius of the user 102, a particular gesture to select a particular word, snap a finger to stop at the last-played word, or use a particular gesture to receive additional information associated with a selected word. In one example, the user 102 may request a particular type of information, such as information related to a person or persons in the user's environment 106 (e.g., description, recognition, activities, posture), information related to location-embedded information, such as via RFID tags or short-range wireless (e.g., BLUETOOTH®) low energy beacons (e.g., tourist information, event information, historical information), or web-based information (e.g., tweets, blogs, or other social media-type posts associated with the selected word). According to an aspect, the 3D Audio Cloud System 206 includes a web information downloader 224 operative to make a web query for information associated with a selected word, and download web-based information for communicating with the word cloud generator 214 for generating a worldview audio cloud based on the web-based information. In some examples, the worldview audio cloud is a 3D audio cloud 116. The user 102 is enabled to select an entity from the worldview 3D audio cloud 116 to get further information, for example, by using gestures or speech commands. As should be appreciated, aspects are not limited to the above example; other examples are possible and are within the scope of the disclosure.

Figure 3:
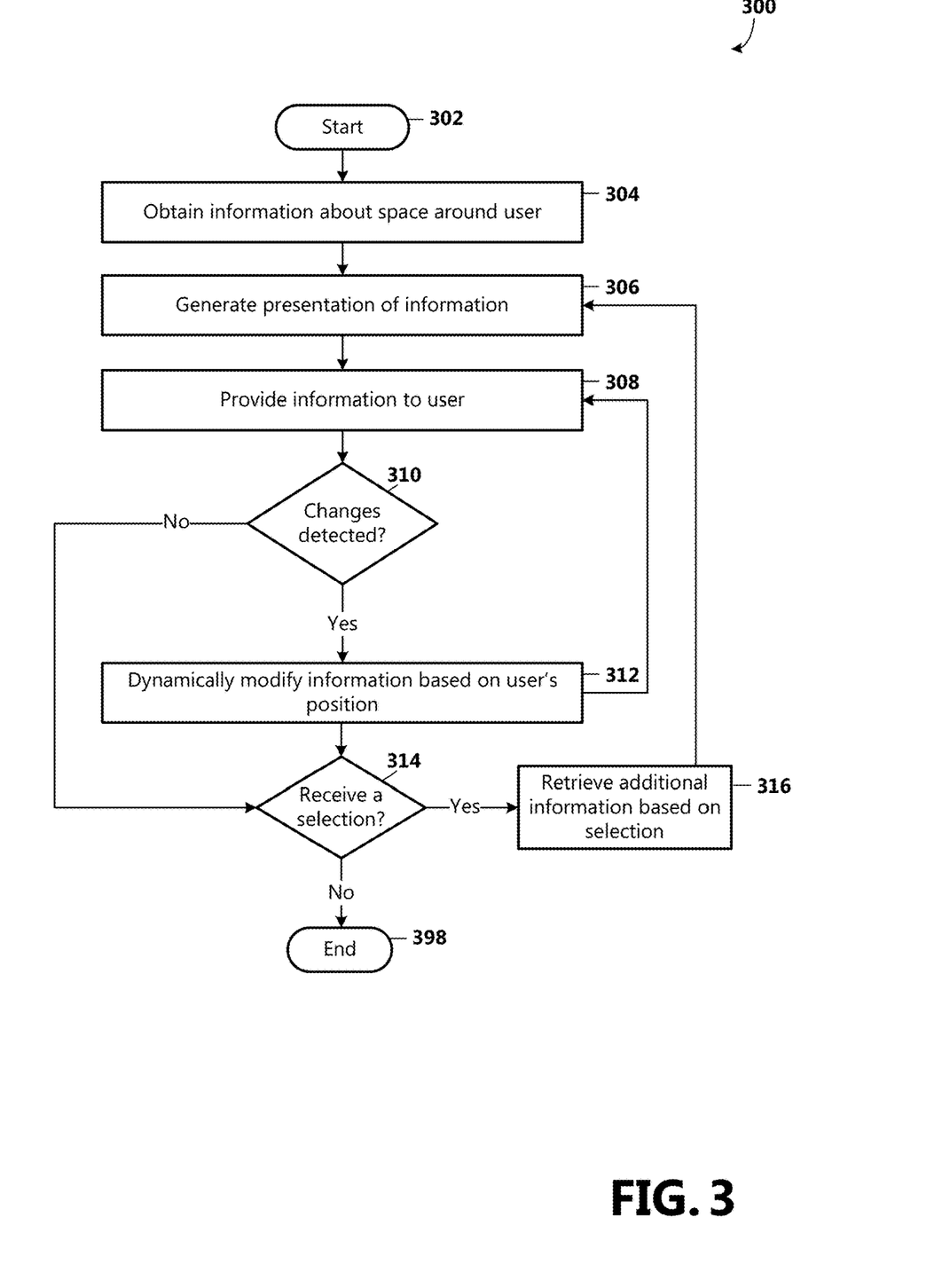
FIG. 3 is a flow chart showing general stages involved in an example method for providing an interactive and responsive presentation of spatially-associated information.

Having described an operating environment and components of the 3D Audio Cloud System 206 with respect to FIGS. 1A,B,C and FIG. 2, FIG. 3 is a flow chart showing general stages involved in an example method 300 for providing an interactive and responsive presentation of spatially-associated information related to a user's environment 106. With reference now to FIG. 3, the method 300 begins at start OPERATION 302, and proceeds to OPERATION 304, where information about the user's environment 106 is obtained. For example, one or more of various environmental capture devices 104 may be used for acquiring information about the user's position and orientation and information about entities 108 in the user's environment 106, such as one or more cameras, depth-sensing cameras, RFID readers, short-range wireless (e.g., BLUETOOTH®) low energy readers, GPS receivers, gesture control devices, accelerometers, etc. According to an example, one or more environmental capture devices 104 may be used to record a video of the user's environment 106, which is converted into a plurality of frames 110 and analyzed for identifying or recognizing entities 108 in the user's environment 106 or for identifying features associated with entities 108 in the environment 106. According to another example, the 3D Audio Cloud System 206 receives one or more frames 110 from an external source (e.g., a 360-degree immersive movie).

The method 300 proceeds to OPERATION 306, where audible output data are associated with the entities 108. According to an example, text 112 is associated with the entities 108 for generating a word cloud 114 representative of the entities 108. Sound properties are applied to the entities 108, and coordinates of the entities 108 are applied for generating a 3D audio cloud 116. For example, an entity 108 can be represented via various types of audible output, such as a spoken textual description, music, tones, natural sounds, synthesized sounds, etc. According to an aspect, the representation of an entity 108 can be based on a functional context, a social context, or an aesthetic context.

At OPERATION 308, the 3D audio cloud 116 is presented to the user 102 via one or more spatial audio-enabled devices 118 (e.g., spatial audio-enabled headset, earbuds, speaker). For example, sound waves are produced to announce entities 108 in the user's environment 106 simulated to originate from each entity's position relative to the user 102, thus providing a virtual 3D audio cloud 116 that exposes the location and distance of entities 108 in the environment 106 respective to the user 102.

The method 300 proceeds to DECISION OPERATION 310, where a determination is made as to whether there are changes in the user's position or changes in the environment 106 as detected by one or more environmental capture devices 104. For example, the user 102 may move through the environment 106 or move the user's head position. As another example, a person in the environment 106 may move positions, someone may move a piece of furniture (e.g., a chair), a person may approach the user 102, etc.

When a change is detected, the method 300 continues to OPERATION 312, where the 3D audio cloud 116 is adjusted accordingly based on coordinates data to help the user 102 to accurately localize entities 108. The method 300 returns to OPERATION 308 to provide the updated 3D audio cloud to the user 102.

When a change is not detected a DECISION OPERATION 310, the method 300 proceeds to DECISION OPERATION 314, where a determination is made as to whether a selection from the user 102 is received. For example, the user 102 may use one or more of various types of input methods for playback control of the 3D audio cloud 116 or to select an entity 108 in the 3D audio cloud 116 or an area of the 3D audio cloud 116.

When a selection from the user 102 is received, the method 300 proceeds to OPERATION 316, where information is retrieved based on the selection. In one example, the user 102 may select an entity 108 in the 3D audio cloud 116 via one of various selection methods (e.g., using a selection device, head or hand gestures, speech command), wherein the selection indicates that the user 102 wants navigation support for the selected entity 108. Accordingly, location information (e.g., coordinate information) for the selected entity 108 is retrieved from the 3D audio cloud 116 or via another technology (e.g., radio frequency identifier, short-range wireless low energy reader, GPS), and at OPERATION 308, navigational guidance (e.g., audio, sonic guidance, hologram navigation, audio map) is provided to the user 102.

In another example, the user 102 may select an area of the 3D audio cloud 116 via one of various selection methods (e.g., using a selection device, head or hand gestures, speech command), wherein the selection indicates that the user 102 wants to zoom in on the selected area. Accordingly, the system zooms in on the captured frames 110 including the selected area, and another 3D audio cloud 116 of the region associated with the selected area is generated and presented to the user 102.

In another example, the user 102 may select an entity 108 in the 3D audio cloud 116 via one of various selection methods (e.g., using a selection device, head or hand gestures, speech command), wherein the selection indicates that the user 102 wants additional information (e.g., aesthetic, functional, social) about the selected entity 108. In one example, when the selected entity 108 is a person, additional information associated with the person is extracted from the captured frames 110 or from known information about a recognized person (e.g., person's age, gender, physical attributes, person's activity, posture). At OPERATION 308, the additional information is provided to the user 102. In another example, location-embedded information related to the selected entity 108 is available (e.g., via RFID tags, short-range wireless low energy beacons, machine-readable codes) and is downloaded for presentation to the user 102. In another example, web-based information or social media information related to the selected entity 108 is available and is downloaded for presentation to the user 102. The additional information may be read to the user 102, or an audio word cloud may be generated from the additional information and presented to the user.

When a selection from the user 102 is not received at DECISION OPERATION 314, the method 300 ends at OPERATION 398.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
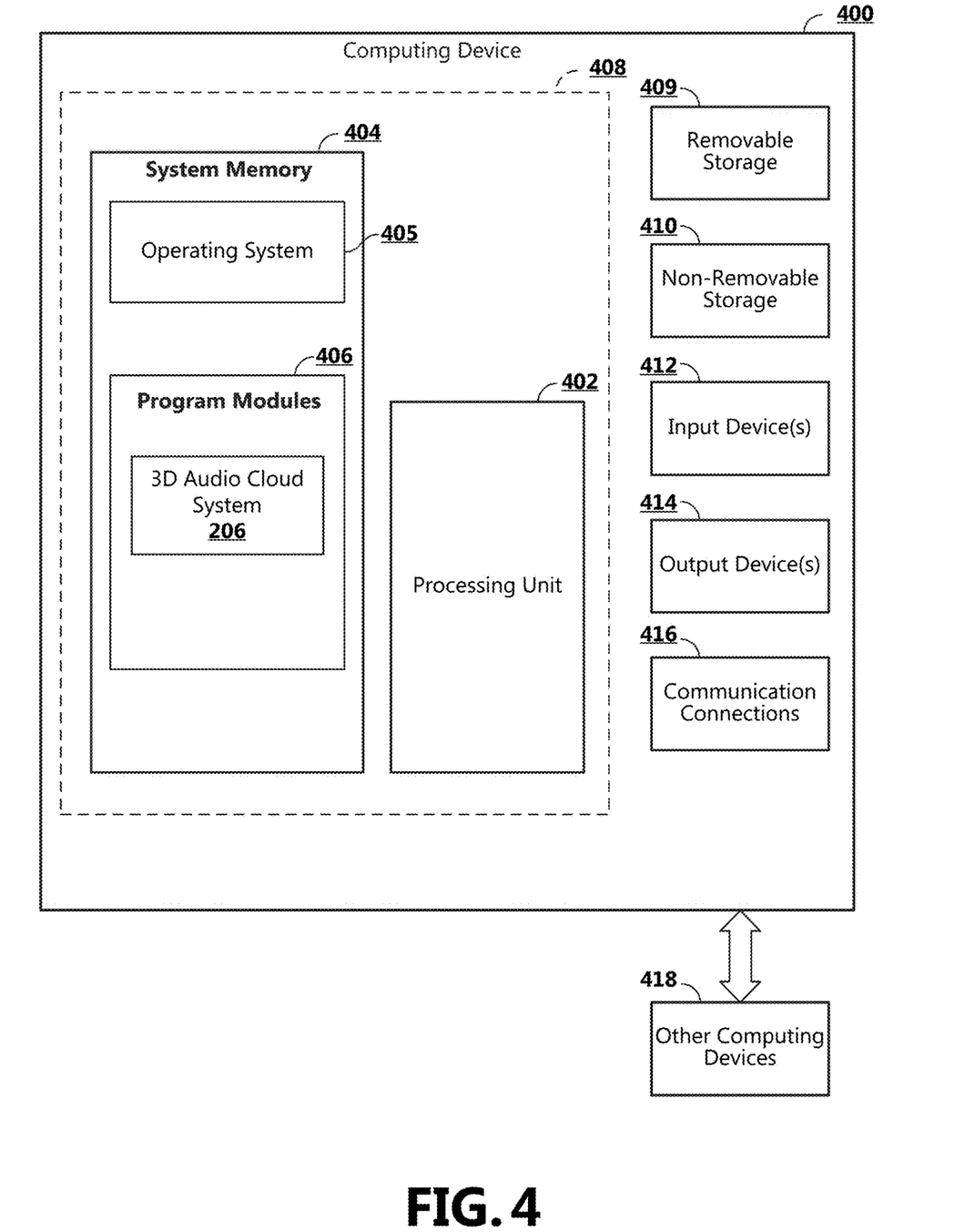
FIG. 4 is a block diagram illustrating example physical components of a computing device.
Figure 5A:
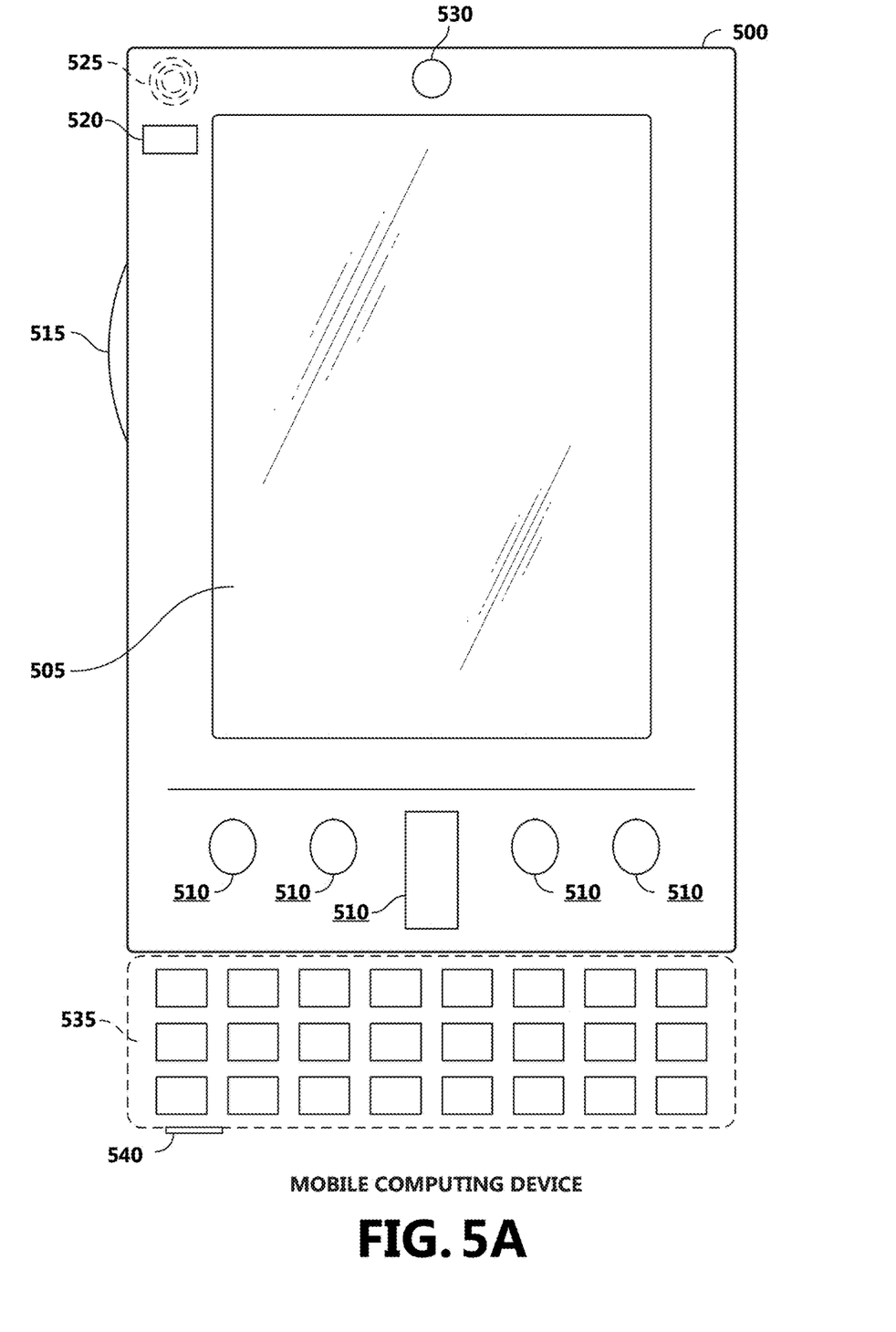
FIGS. 5A and 5B are simplified block diagrams of a mobile computing device.
Figure 5B:
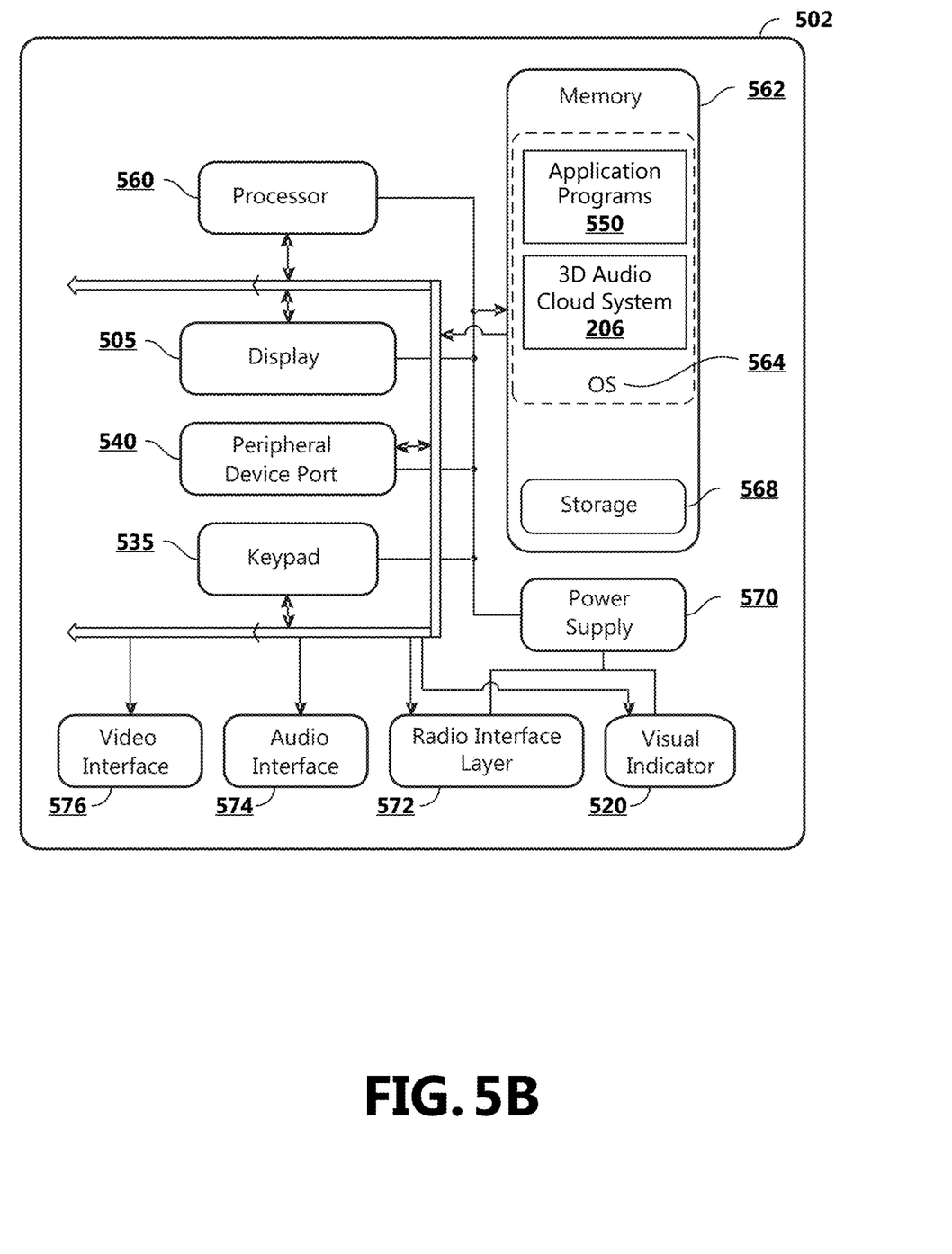
Figure 6:
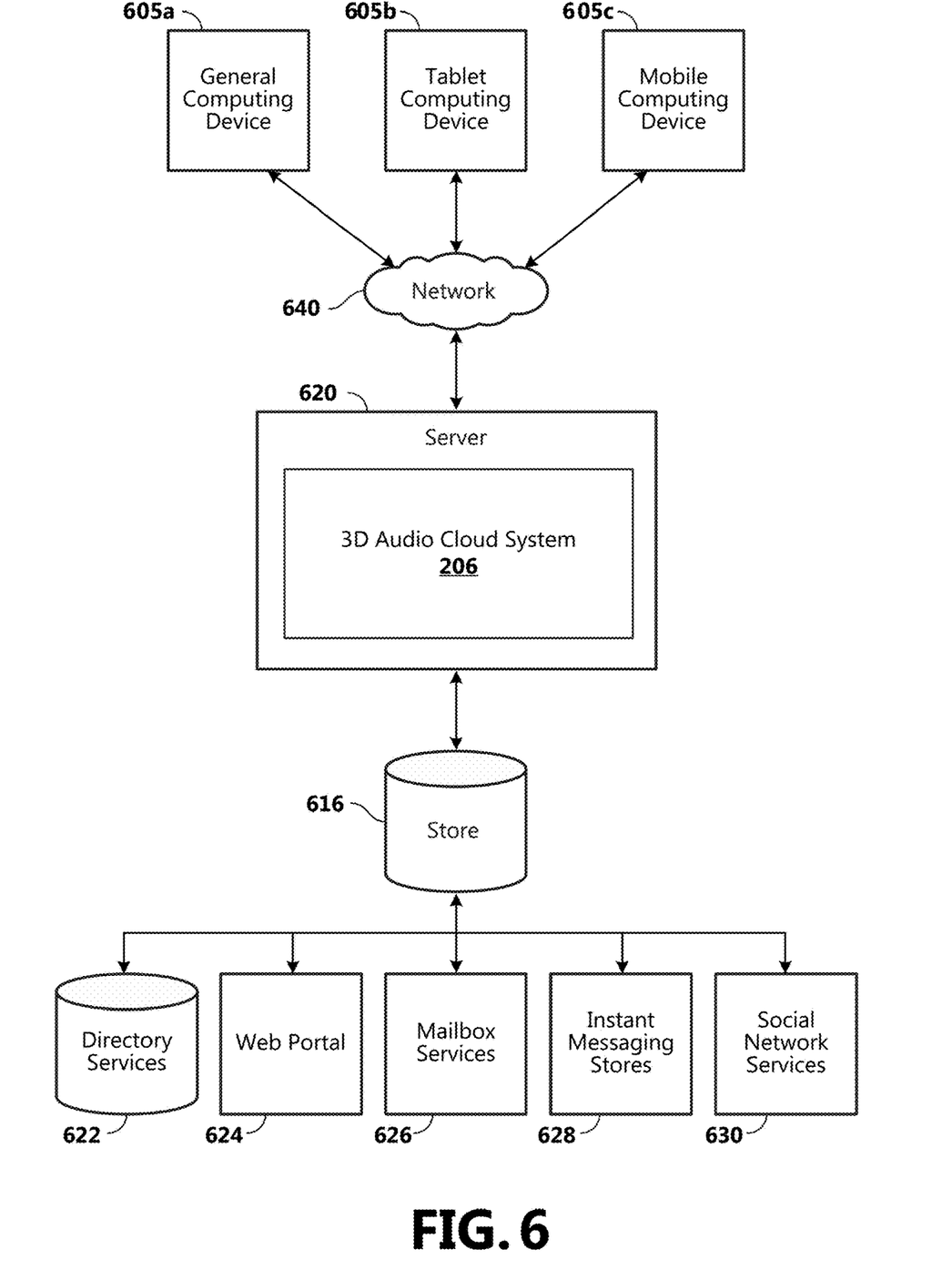
FIG. 6 is a simplified block diagram of a distributed computing system.

FIGS. 4-6 and the associated descriptions provide a discussion of a variety of operating environments in which examples are practiced. However, the devices and systems illustrated and discussed with respect to FIGS. 4-6 are for purposes of example and illustration and are not limiting of a vast number of computing device configurations that are used for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes one or more components of the 3D Audio Cloud System 206. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., one or more components of the 3D Audio Cloud System 206) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit using a microprocessor, or on a single chip containing electronic elements or microprocessors. For example, aspects are practiced via a system-on-a-chip (SOC) where each or many of the components illustrated in FIG. 4 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 400 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media is part of the computing device 400. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or less input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, one or more components of the 3D Audio Cloud System 206 are loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 is stored locally on the mobile computing device 500, as described above. According to another aspect, the data is stored on any number of storage media that is accessible by the device via the radio 572 or via a wired connection between the mobile computing device 500 and a separate computing device associated with the mobile computing device 500, for example, a server computer in a distributed computing network, such as the Internet. As should be appreciated such data/information is accessible via the mobile computing device 500 via the radio 572 or via a distributed computing network. Similarly, according to an aspect, such data/information is readily transferred between computing devices for storage and use according to well-known data/information transfer and storage means, including electronic mail and collaborative data/information sharing systems.

FIG. 6 illustrates one example of the architecture of a system for providing an interactive and responsive presentation of spatially-associated information related to a user's environment as described above. Content developed, interacted with, or edited in association with the 3D Audio Cloud System 206 is enabled to be stored in different communication channels or other storage types. For example, various documents may be stored using a directory service 622, a web portal 624, a mailbox service 626, an instant messaging store 628, or a social networking site 630. One or more components of the 3D Audio Cloud System 206 are operative to use any of these types of systems or the like for providing an interactive and responsive presentation of spatially-associated information related to a user's environment, as described herein. According to an aspect, a server 620 provides one or more components of the 3D Audio Cloud System 206 to clients 605a,b,c. As one example, the server 620 is a web server providing the 3D Audio Cloud System 206 over the web. The server 620 provides one or more components of the 3D Audio Cloud System 206 over the web to clients 605 through a network 640. By way of example, the client computing device is implemented and embodied in a personal computer 605a, a tablet computing device 605b or a mobile computing device 605c (e.g., a smart phone), or other computing device. Any of these examples of the client computing device are operable to obtain content from the store 616.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for providing an interactive and responsive presentation of spatially-associated information related to a user's environment, comprising:
   capturing or receiving an image of the user's environment;
   performing an image recognition process utilizing the image to identify an entity within the image and to provide text associated with the identified entity as audible output data;
   applying coordinate information associated with the entity, relative to a location of the user in the environment, to the audible output data associated with the entity;
   generating a 3D audio cloud defining a space corresponding to the environment, wherein the audible output data is arranged within the space based upon the coordinate information of the entity; and
   providing audible output data of the 3D audio cloud to the user based on a configurable context associated with the user, the context being at least one of a functional context, a social context, or an aesthetic context.

2. The method of claim 1, wherein acquiring information associated with the entity comprises:
   identifying, in the image, attributes associated with the entity.

3. The method of claim 1, further comprising acquiring information associated with the entity comprises at least one of reading a fiducial tag associated with entity in the environment or receiving information from a short-range wireless low energy beacon associated with the entity.

4. The method of claim 1, further comprising associating audible output data with the entity including associating one of:
   speech;
   synthesized audio; or
   recorded audio.

5. The method of claim 1, further comprising associating audible output data with the entity including:
   associating text with the entity;
   generating a word cloud, wherein the word cloud is comprised of the text associated with the entity; and
   applying a size factor to the text associated with the entity, wherein the size factor is based on one of:
      a prominence of the entity in the environment;
      a confidence score of the identification of the entity;
      a physical size of the entity;
      a determined importance of the entity in the environment; or
      a determined relevance of the entity to the user.

6. The method of claim 5, further comprising applying sound properties to the text associated with the entity, wherein the sound properties are based on the size factor.

7. The method of claim 1, further comprising:
   receiving a user-selection of the entity provided to the user in the 3D audio cloud;
   retrieving additional information associated with the selected entity based on a type of selection made by the user; and
   providing the additional information to the user.

8. The method of claim 7, wherein providing the additional information to the user comprises at least one of providing location-embedded information related to the selected entity or providing navigational information to the selected entity from a current location of the user.

9. The method of claim 7, wherein providing the additional information to the user comprises providing web-based information related to the selected entity.

10. The method of claim 1, further comprising:
    receiving a user-selection of an area of the 3D audio cloud, wherein the user-selected area defines a space corresponding to a region in the user's environment;
    acquiring information associated with one or more entities in the region;
    associating audible output data with each of the one or more entities;
    applying coordinate information associated with each of one or more entities, relative to a location of the user in the environment, to the audible output data associated with each of the one or more entities;
    generating a second 3D audio cloud defining the space corresponding to the region in the user's environment, wherein the audible output data is arranged within the space based upon the coordinate information of the one or more entities; and
    providing the second 3D audio cloud to the user.

11. A system for providing an interactive and responsive presentation of spatially-associated information related to a user's environment, the system comprising:
    at least one processing device; and
    at least one computer readable data storage device storing instructions that, when executed by the at least one processing device, cause the system to:
       capturing or receiving an image of the user's environment;
       performing an image recognition process utilizing the image to identify an entity within the image and to provide text associated with the identified entity as audible output data, the audible output data comprising one of:
          speech;
          synthesized audio; or
          recorded audio;

apply coordinate information associated with the entity, relative to a location of the user in the environment, to the audible output data associated with the entity;

generate a 3D audio cloud defining a space corresponding to the environment, wherein the audible output data is arranged within the space based upon the coordinate information of the entity; and provide audible output data of the 3D audio cloud to the user based on a configurable context associated with the user, the context being at least one of a functional context, a social context, or an aesthetic context.

12. The system of claim 11, further comprising acquiring information associated with the entity, the system further operative to:

receive an image of the environment, wherein the image is one of:
 a raster image;
 a video; or
 a depth image; and
identify, in the image, the entity or attributes associated with the entity.

13. The system of claim 11, further comprising acquiring information associated with the entity, the system operative to:

read a fiducial tag associated with the entity in the environment via radio frequency means or optical means; or receive information from a short-range wireless low energy beacon associated with the entity.

14. The system of claim 11, further comprising associating audible output data with the entity, the system operative to:

associate text with the entity;
generate a word cloud, wherein the word cloud is comprised of the text associated with the entity; and
apply a size factor to the text associated with the entity, wherein the size factor is based on one of:
 a prominence of the entity in the environment;
 a confidence score of the identification of the entity;
 a physical size of the entity;
 a determined importance of the entity in the environment; or
 a determined relevance of the entity to the user.

15. The system of claim 14, wherein the system is further operative to apply sound properties to the text associated with the entity, wherein the sound properties are based on the size factor.

16. The system of claim 11, wherein the at least one processing device is further operative to:

receive a user-selection of the entity provided to the user in the 3D audio cloud;

retrieve additional information associated with the selected entity based on a type of selection made by the user; and provide the additional information to the user, wherein in providing the additional information to the user, the at least one processing device is operative to provide at least one of:
 navigational information to the selected entity from a current location of the user;
 location-embedded information related to the selected entity;
 web-based information related to the selected entity; or
 attribute information related to the selected entity.

17. A computer readable storage device including computer readable instructions, which when executed by a processing unit is operative to:

acquire information associated with at least one entity in a user's environment, wherein acquiring information includes:
 capturing or receiving an image of an environment of the user; and
 performing an image recognition process utilizing the image to identify the at least one entity within the image and to provide text associated with the identified at least one entity as audible output data;

associate audible output data with the at least one entity;

apply coordinate information associated with the at least one entity, relative to a location of the user in the environment, to the audible output data associated with of the at least one entity;

generate a 3D audio cloud defining a space corresponding to the environment, wherein the audible output data is arranged within the space based upon the coordinate information of the at least one entity; and provide audible output data of the 3D audio cloud to the user based on a configurable context associated with the user, the context being at least one of a functional context, a social context, or an aesthetic context.

18. The computer readable storage device of claim 17, wherein the device is further operative to:

receive a user-selection of an entity of the at least one entity provided to the user in the 3D audio cloud;

retrieve additional information associated with the selected entity based on a type of selection made by the user; and provide the additional information to the user, wherein in providing the additional information to the user, the device is operative to provide at least one of:
 navigational information to the selected entity from a current location of the user;
 location-embedded information related to the selected entity;
 web-based information related to the selected entity; or
 attribute information related to the selected entity.

19. The method of claim 1, further comprising:

providing audible output data of the 3D audio cloud to the user based on a selected first context, the selected first context being at least one of a functional context, a social context, or an aesthetic context; and providing audible output data of the 3D audio cloud to the user based on a selected second context, the selected second context being at least one of a functional context, social context, or an aesthetic context, wherein the first context is different from the second context, and wherein the provided audible output data of the 3D audio cloud based on the selected second context is different from the provided audible output data of the 3D audio cloud based on the selected first context.

20. The method of claim 19, wherein the audible output data of the 3D audio cloud based on the selected second context and the audible output data of the 3D audio cloud based on the selected first context are for a same entity in the user's environment.

* * * * *